United States Patent [19]

Dennison et al.

[11] 4,048,660
[45] Sept. 13, 1977

[54] RECORD TRACK FOLLOWING AND SEEKING

[75] Inventors: James Clifford Dennison, Broomfield, Colo.; Hjalmar Holmboe Ottesen, Oslo, Norway

[73] Assignee: International Business Machines Corporation, Armonk, N.Y.

[21] Appl. No.: 643,892

[22] Filed: Dec. 23, 1975

[51] Int. Cl.² .................... G11B 5/58; G11B 17/00; G11B 21/10
[52] U.S. Cl. .................................... 360/77; 360/78; 360/135
[58] Field of Search .................... 360/77, 75, 78, 105, 360/106, 109, 135

[56] References Cited

U.S. PATENT DOCUMENTS

| 3,479,664 | 11/1969 | Stuart-Williams et al. | 360/77 |
| 3,491,347 | 1/1970 | Farrand | 360/77 |
| 3,534,344 | 10/1970 | Santana | 360/77 |
| 3,699,555 | 10/1972 | Du Vall | 360/78 |
| 3,737,883 | 6/1973 | Sordello | 360/78 |
| 3,812,533 | 5/1974 | Kimura et al. | 360/77 |
| 3,893,180 | 7/1975 | Braun et al. | 360/77 |
| 3,919,697 | 11/1975 | Walker | 360/77 |

OTHER PUBLICATIONS

IBM Technical Disclosure Bulletin, Comstock et al., Quadrature Servo Signal Utilizing a Detection System, vol. 16, No. 7, p. 2204.
IBM Technical Disclosure Bulletin, Wallis, Tri-Bit Servo Pattern, vol. 16, No. 11, Apr. 1974, p. 3757.

Primary Examiner—Alfred H. Eddleman
Attorney, Agent, or Firm—Herbert F. Somermeyer

[57] ABSTRACT

An improved servo block pattern bands a plurality of parallel record tracks into a track seek and follow band. Servo block positions in the record tracks, plus the longitudinal duration of the signal bursts enable simultaneous track seeking and following within a band of tracks. Servo apparatus operable with such patterns adapt to amplitude variations of the servo readback signal to reduce the effect of amplitude variations on servo performance. The servo blocks may have differing frequencies or correlation patterns for enhancing track seek and follow functions.

56 Claims, 14 Drawing Figures

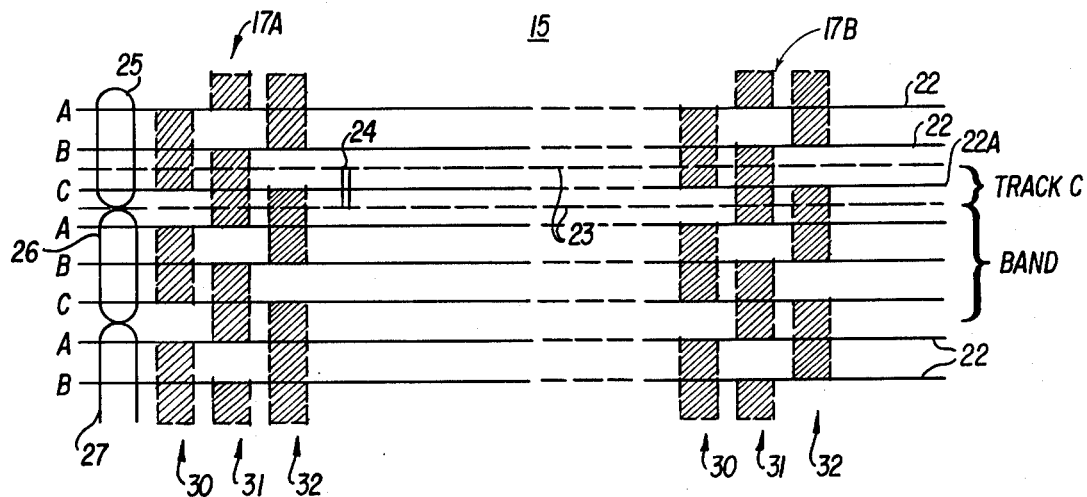
FIG. 2 A PRIOR PATTERN
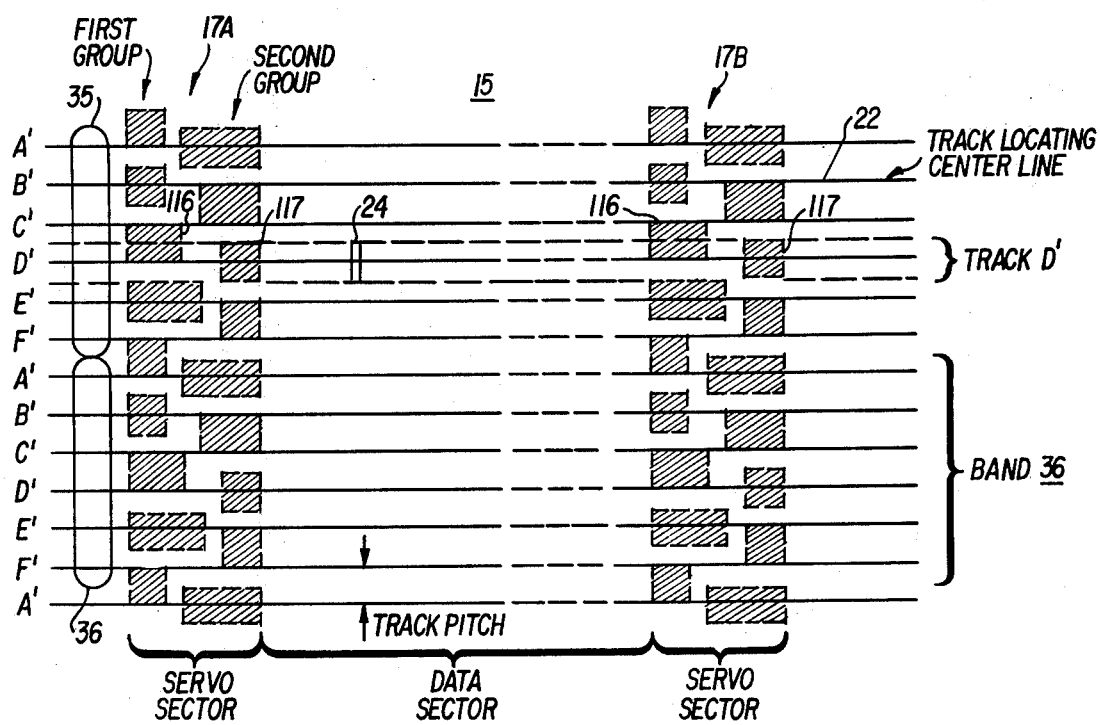
FIG. 3

FIG. 5 HEAD POSITIONER 60

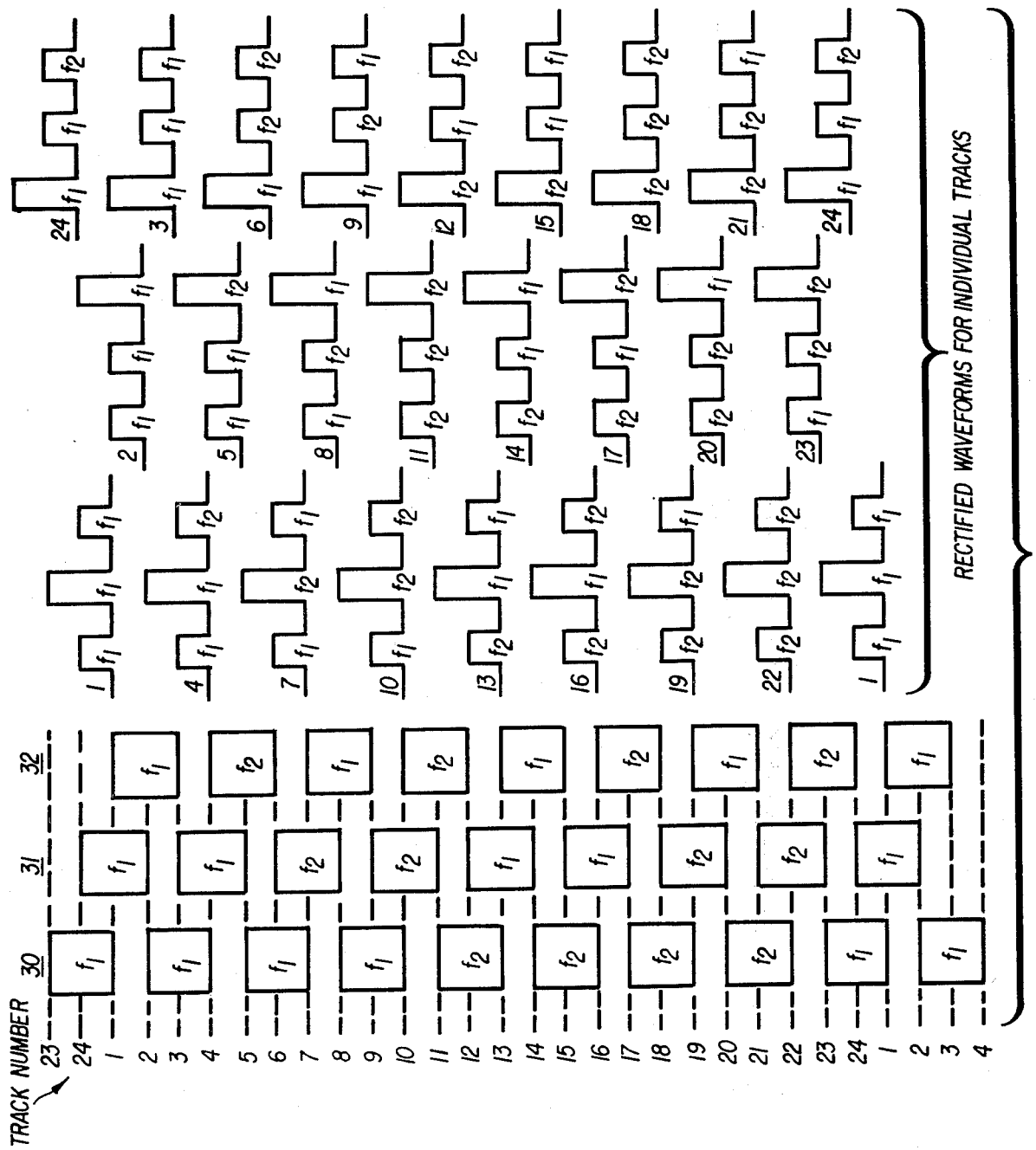

RECORD TRACK FOLLOWING AND SEEKING

DOCUMENT INCORPORATED BY REFERENCE

U.S. Patent Sippel 3,185,982 is cited for showing interspersed data and positioning information signals.

COMMONLY ASSIGNED AND RELATED PATENT APPLICATIONS

Zimmerman et al, Ser. No. 722,183, filed Sept. 10, 1976, entitled "Positioning Device for the Access Arm of the Magnetic Head of a Magnetic Disk Storage", and claiming priority of invention under 35 USC 119, based upon an original application filed even date herewith, in the Federal Republic of Germany.

Baca et al, Ser. No. 643,900, filed even date herewith, and entitled "Track Seeking and Following".

The above-identified, commonly assigned, patent applications relate to track following and locating using patterns relatable to the present invention.

BACKGROUND OF THE INVENTION

The present invention relates to record track following and seeking, particularly to improved patterns plus apparatus for utilizing such patterns for both track following and seeking.

In magnetic data recorders, particularly of the rotating disk type, high track densities, i.e., densities greater than 500 tracks per inch (tpi), require electronic servo controls for precisely positioning recording and sensing transducers with respect to a given record track. This is achieved by two modes of operation. First, the track to be accessed must be first located. This action is termed "track seeking" and is achieved by relatively moving the transducer with respect to the record member in a direction transverse to the length of the tracks until the appropriate track is located. Once the track is located, a second mode of operation, called "track following", keeps the transducer centered as close as possible on the track being accessed.

In a multidisk recorder, one of the disk surfaces is reserved for containing such servo patterns whereby a so-called "comb" head assembly can move radially of the record disk for accessing record or data tracks on the other record surfaces. In other disk recorders, where only a single disk surface is accessed at a given time and employing a transducer assembly designed to operate with but a single disk surface, the luxury of a separate servo signal disk surface is not available. In those situations, so-called "sector servoing" is employed, such as taught by Sippel, supra. In these latter systems, sector patterns, i.e., positioning information signals, are interleaved betweeen data signals such that as the record member relatively passes the sensing transducer, positioning and data signals are alternately sensed by the transducer. This arrangement enables the transducer to be automatically and precisely positioned with respect to the record track being accessed.

While the above-stated actions on their face appear simple and straightforward, as track density increases in order to create a greater storage capacity per disk surface, locating a record track from a plurality of record tracks on a random basis becomes an exceedingly difficult proposition. This is particularly true if one desires to servo position the recording transducer directly to the track to be accessed without overshoot plus a successful track access on each and every try. An additional problem arises in that, as the track widths are decreased and the track pitch (center-to-center spacing of adjacent tracks) is decreased, the position indicating or servo signals have correspondingly less amplitude. This means that the amplitude of the readback signal becomes smaller and more unpredictable. That is, the servo signals become more susceptible to dropouts, transducer-to-record-surface spacing variations, and intermodulation in the transducer of signals detected from two adjacent record tracks. The above-identified problems are magnified when flexible record media are employed. Further, the substances of flexible record disks exhibit such dimensional instability that position indicating servo signals and the information signals must be on the same disk, at least at higher recording densities (track density in particular).

Accordingly, it is desired to provide rapid track acquisition and precise following. All of the above should be achieved at minimum cost because of the competitive nature of record storage apparatus.

Another important factor is the reliable detection and evaluation of the positioning or servo signals received by the servo apparatus. Such servo apparatus should exhibit a maximal tolerance to amplitude variations, intermodulation perturbations, record track eccentricities, and yet be fully responsive to signals indicating a position error signal with respect to positioning a transducer with respect to a record track.

SUMMARY OF THE INVENTION

It is an object of the present invention to provide improved servo patterns for use in positioning two members relative to each other, and for providing enhanced and simplified apparatus for interpreting the signal patterns.

A servo signal pattern in accordance with certain aspects of the invention comprises first and second groups of servo signals aligned transversely to track locating lines on a record member. The servo signal groups are spaced longitudinally along the lines. A servo signal in each of the groups has an extent transverse to the lines of about the spacing of adjacent ones of the locating lines and having different lengths or durations along the length of the lines. It is preferred that servo signals having shorter lengths are longitudinally adjacent signals of longer lengths in the respective groups. Predetermined ones of the servo signals abut at least one of said locating lines, while other predetermined ones of the servo signals are centered on other ones of said locating lines.

In a preferred method of operation, the servo signals are arranged in radial bands such that coarse positioning can be directed toward first locating a band of servo signals. The servo signals forming a block pattern within a band are not necessarily continuous. Apparatus of the invention then identifies and locates a given one of the lines within the band.

Transverse spacing between servo blocks or patterns in at least one of the groups is approximately one-half the line pitch, i.e., one-half the spacing between adjacent ones of said locating lines. Servo blocks in the two groups include pairs of position indicating signals, including a pair having a signal in one group centered on a locating line and another signal of the pair in the second group being disposed on one side of such locating line. Other servo signal pairs have signals from one group abutting a given locating line on one side and a signal from a second group abuts the same line from the opposite side.

Apparatus employable with the above-described patterns perform track seek and follow functions for two relatively moving members including first means for measuring and indicating the duration of a plurality of servo signals. Control means are responsive to the indication to supply a set of control signals in accordance with such indications. Integrator means receive the servo signals and are responsive to the control signals for integrating the received servo signals at a given rate in accordance with the control signals to supply an indication usable for track following or ultrafying positioning. Finally, compare means are responsive to both indications to supply a position error signal for effecting relative motion of the members toward a given or desired relative position.

In a variation of the basic fundamentals of the present invention, the various servo signals have differing frequencies or other correlation type characteristics for further enhancing the discrimination power of the servo apparatus when sensing the servo positioning signals. In a preferred form of the invention, the servo patterns are combined with the apparatus of the invention to provide a so-called "sector servoing" wherein a given servo sector contains positioning information which is interleaved among data sectors of a record member. In a most preferred form, the record member is a rotating magnetically coated record disk. A transducer moves radially of the disk for accessing any of the plurality of tracks on the disk for scanning same to supply sensed signals to a servomechanism and to data signal handling apparatus. A tachometer indicates precise angular position for gating the servo and data signals to the appropriate destination.

Another aspect of the invention is the adaption of apparatus to amplitude variations of the readback signals, particularly when employing amplitudes as indications of position error. Each locating line may signify location of one or more record tracks.

The foregoing and other objects, features, and advantages of the invention will become apparent from the following more particular description of the preferred embodiment, as illustrated in the accompanying drawing.

THE DRAWING

FIG. 2 is a diagrammatic showing of a prior sector servo pattern with which the apparatus of the present invention may be employed and with which the present invention provides certain improvements thereover.

FIG. 3 is a diagrammatic showing of sector servo patterns of a constructed embodiment of the present invention.

FIG. 11 diagrammatically illustrates an application of a multifrequency discriminator function into the FIG. 2 illustrated servo signal pattern.

Figure 12:
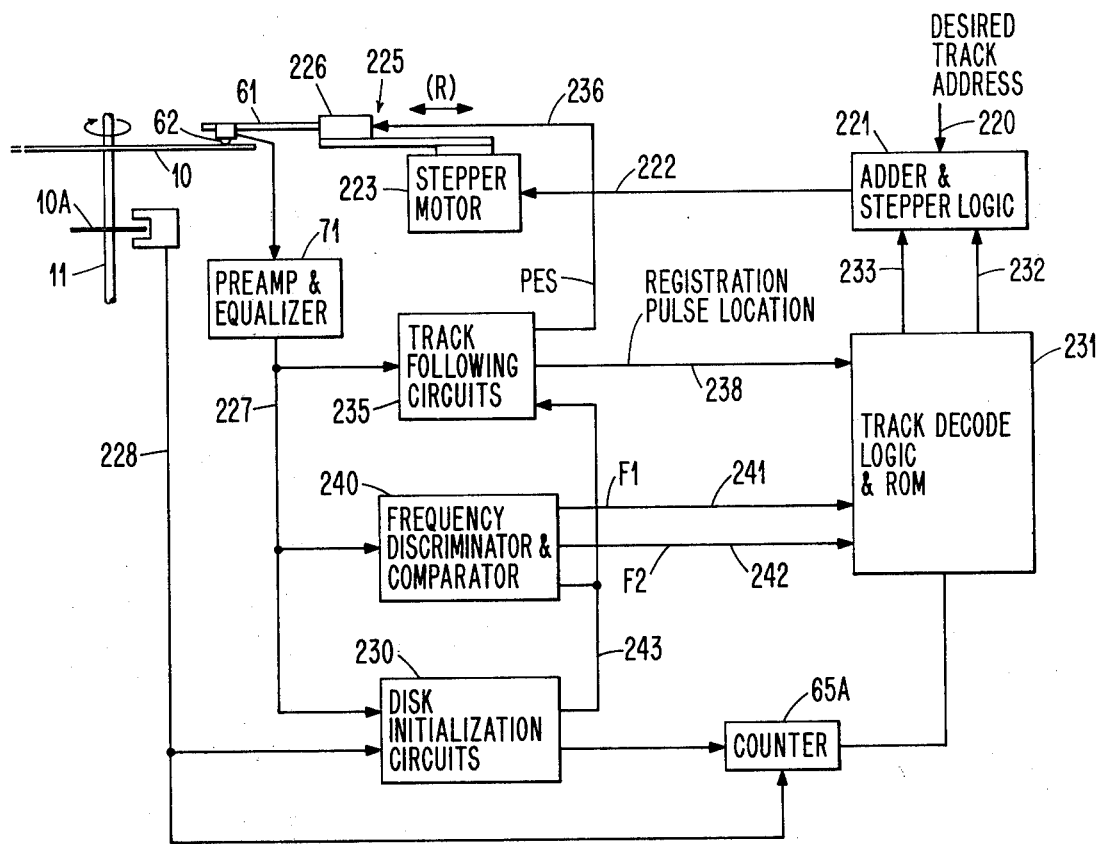

FIG. 12 is a diagrammatic showing of apparatus employing the FIG. 11 illustrated discriminator function.

DETAILED DESCRIPTION

Referring now more particularly to the drawing, like numerals indicate like parts and structural features in the various diagrams.

PREFERRED ENVIRONMENT

Figure 1:
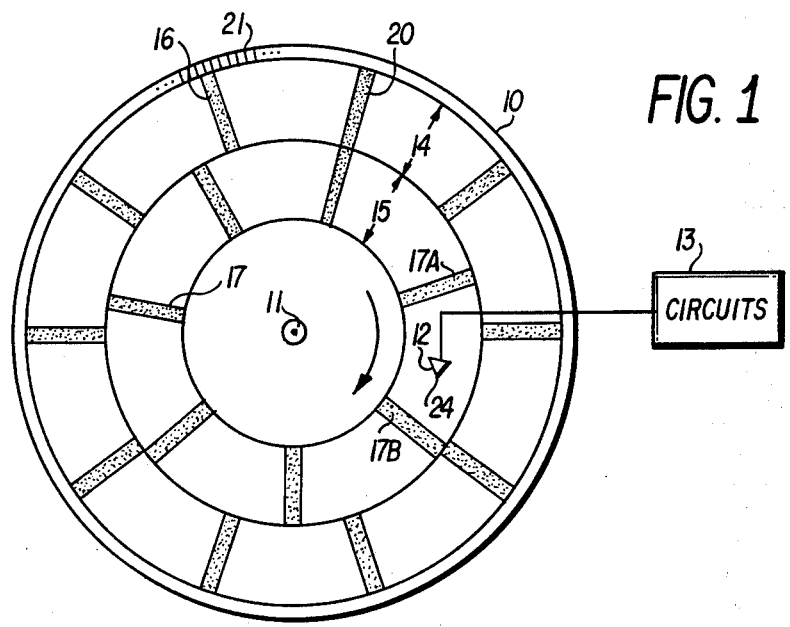
FIG. 1 is a diagrammatic simplified plan showing of a record storage disk which may employ the present invention.

FIG. 1 diagrammatically illustrates a record storage disk 10 rotatable about axis 11 relative to radially positionable transducer 12 electrically connected to data and servo circuits 13. The recording area of disk 10 is divided into a plurality of separate recording areas, such as outer area 14 and inner area 15, each area having a given number of concentric record tracks scannable by transducer 12. In each of the record areas, the data recordings in such areas are interspersed by a plurality of interleaved positioning or sector servo signals indicated by the hatched areas 16 and 17, respectively, in areas 14 and 15. The circumferential displacement at the radially inwardmost portion of the two recording areas between adjacent sector servo signal areas 16 and 17 are made identical in the two record areas. In this manner, the time required for adjacent ones of the sector servo areas 16 and 17 to pass under transducer 12 is at a predetermined minimal time. For angular addressing purposes, an index line 20 extends radially through both record areas 14 and 15. Index line 20 resets all angular position indicating circuitry, as is well known in the art. The angular position of record disk 10, with respect to transducer 12, is additionally indicated by a set of tachometer marks 21 disposed at the outer circumference. While record disk 10 is a preferred form of practicing the invention, the invention can be practiced with equal facility on rectilinearly transported record members such as ½ inch tape; and the broad principles of the invention can also be applied to relatively positioning two members, whether one is a record member or not.

A PRIOR SYSTEM

FIG. 2 illustrates a prior sector servo pattern taken from record area 15 and including a diagrammatic showing of two sector servo areas 17A and 17B. The horizontal lines represent so-called "track locating" lines. In the most preferred form, such track locating lines identify the center of the record track as illustrated at track C by track locating line 22A. Track C has a width, indicated by dash lines 23, scannable by a sensing/recording transducer gap diagrammatically illustrated by small rectangle 24. The tracks are banded into identifiable groups of three. To address tracks B, the three tracks are respectively identified by the alphabetic characters A, B, and C in bands 25, 26, and 27. The FIG. 2 illustrated servo pattern assumes that a positioner (not shown) can position a transducer 12 having a gap 24 radially within a so-called "positioning window" having an extent not greater than the radial extent of a band of tracks. When this is done, the center track B within a given band can be located by examining the readback signal from the transducer 12 sensing the servo signals in the three servo groups 30, 31, and 32 in either of the servo sectors 17A and 17B. Each and every track to be addressed for positioning purposes is a center track of a band of three tracks, as will become more apparent.

Figure 2A:
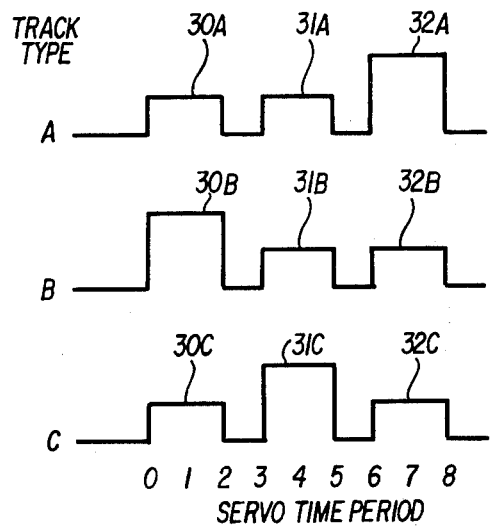
FIG. 2A shows a simplified set of signal waveforms illustrating the operation of servo functions with respect to the FIG. 2 illustrated sector servo patterns.

Referring to FIG. 2A, the readback signals from the servo signals of FIG. 2 are shown for a track centered transducer, such as transducer gap 24 being centered over track C about center locating line 22A. In this case, the track C is a center track. As gap 24 scans the signal from group 30, a first half amplitude readback signal 30C is followed by full amplitude readback signal 31C, which in turn is followed by a half amplitude signal 32C. This sequence of amplitudes is unique to track C thereby identifying same. The full amplitude signal is termed a registration servo signal or pulse. In a similar manner, track A is identified by the sequence of half amplitude signals 30A, followed by signal 31A, which in turn is followed by full amplitude (registration) signal 32A. Similarly, a track B is identified by a full amplitude (registration) signal 30B, followed by two half amplitude signals 31B and 32B. This pattern yields a location window of ± one track for each track to be located.

INVENTIVE DI-BLOCK PATTERNS

Figure 3A:
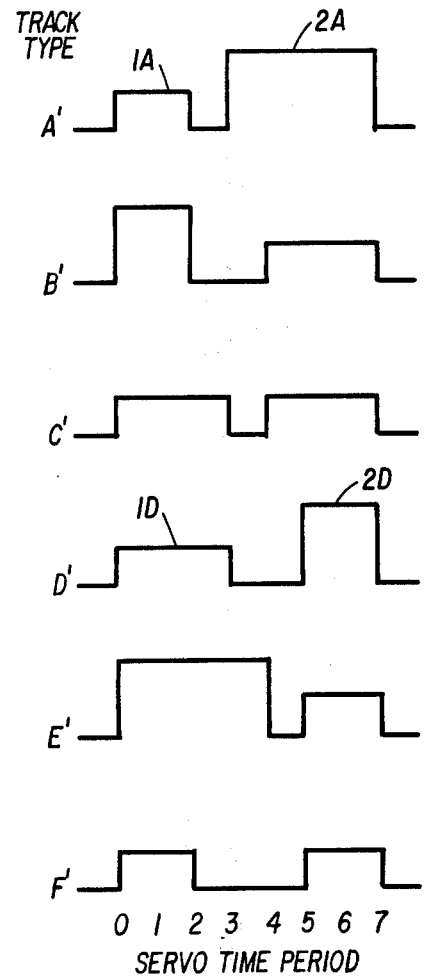
FIG. 3A shows a set of idealized readback signal waveforms usable to describe the operation of sector servoing when using the FIG. 3 illustrated sector servo patterns.

The present invention provides certain improvements over the FIG. 2 and 2A track seeking and following patterns, as will become apparent. In one aspect of the invention, rather than having three tracks in the band of tracks, a constructed embodiment employing the present invention has a band of six tracks A'–F', as best seen in FIG. 3, in bands 35 and 36. Again, for each track to be located, there is a set of six tracks constituting an initial positioning "window". Each track A has a six-track window D to C, tracks B from E to D, etc. The FIG. 3 illustration is also based upon a showing of record area 15 having two adjacent servo sectors 17A and 17B being scanned by gap 24 of transducer 12. As shown in FIG. 3, a track location window of ± 2½ tracks is achieved. The FIG. 3 illustrated pattern has two groups of servo signals, a first group and a second group respectively transversely aligned with respect to the track location lines 22. Gap 24 is shown as being centered over track D' of band 35. Idealized readback signals from the FIG. 3 illustrated sector servo signals are shown in FIG. 3A. Track type A' is identified by a half amplitude signal 1A followed by a full amplitude signal 2A. Also note that the durations of the signals are relatively short and long, respectively. Track B' is indicated by a relatively short full amplitude signal 1B separated by a long interval from a half amplitude, long duration signal 2B. A C' type track is identified by two successive half amplitude long duration signals 1C and 2C. Track D' is indicated by a long duration, one-half amplitude signal 1D separated from a short duration, full amplitude signal 2D. Track type E' is indicated by long duration, full amplitude signal 1E, closely followed by a short duration, half amplitude signal 2E. The track type F' is identified by two successive half amplitude, short duration, widely spaced signals 1F and 2F. For ease of reference later on, the signals are identified as occurring in eight time periods 0–7.

Turning to FIG. 3, the signals for track type D' are described. In the first group, gap 24 scans one-half the width of the first group signals yielding a half amplitude, long duration signal 1D while scanning the entire width of the second group signal yielding full amplitude, short duration signal 2D. As will become apparent, track position errors are similarly indicated enabling efficient track following operations. Each of the tracks and associated signals in FIG. 3A can be analyzed to show the relationship of the FIG. 3A signals to the transverse locations of the servo signal shown in FIG. 3.

Some comments about the geometry of the FIG. 3 illustrated pattern are first in order. The transverse locations of the signals in the respective first and second groups alternate between being centered on a track locating center line 22 and being disposed intermediate two adjacent ones of said lines. While the two groups of servo signals are generally longitudinally aligned, the servo signals, each of which have a width approximating the pitch of the tracks represented by the transverse spacing of the lines 22, are each offset from another providing the amplitude changes in the FIG. 3A illustrated signals, the exception being a second type of track indication for tracks C' and F'. Further, the duration of the signals in the first group is relatively short when substantially longitudinally aligned with longer signals in the second group, and vice versa. Track C' is identified by two identical length signal bursts, each of which but the track center line, as is track F'. By intermixing such signals in the two groups, a minimal longitudinal extent is required for providing positioning signals. The hatched areas in FIG. 3 represent constant frequency recorded signals. In one embodiment, five cycles were recorded for each servo time period (0–7). In other embodiments of the invention, as will be explained in more detail later, adjacent tracks may be distinguished by bursts of differing frequencies or other correlating type of signal patterns.

While FIG. 3 illustrates a two-group pattern for uniquely identifying six record tracks in a group of tracks in a reliable manner, other patterns having a greater number of groups of servo signals are within the contemplation of the present invention, which results in a greater number of tracks in each band. For example, other patterns (not disclosed herein) resulted in identifying 25 tracks in each band of tracks.

Having described the patterns for sector servoing or other servoing positioning operations, factors involved in track seeking and following using the concepts of the present invention, are described. In a track seeking mode within a given band, all nearby or adjacent tracks must be uniquely identifiable, such as identifiable by the FIG. 2A and 3A indicated readback signals. For a relatively narrow band of tracks, i.e., a small number of tracks in the band, care has to be exercised to avoid overshooting the transducer outside the band. This means the narrower the band of tracks, the slower the seek speed, hence, possibly increased access time to a given track. Accordingly, by extending the number of identifiable tracks in the band to six, the present invention enhances access time by allowing a more rapid seek speed. Similarly, for coarse positioning transducer 22 with respect to a band of tracks, a larger band permits a more rapid access to a given band, as well as permitting greater tolerances in the positioning accuracy of such a coarse positioner. Such a coarse positioner could use a linear scale on the frame of the apparatus mounting the record member, such as is employed in present direct access storage devices of the disk type. All of these factors affect the allowable maximum track density or minimum track pitch and, hence, has a material effect on the storage capacity of a record member.

In accordance with a preferred mode of operating with the inventive servo patterns of this invention, track seeking within a band of tracks is achieved by merely measuring the duration of the sector servo signals within each sector. Examination of FIG. 3A shows that each track is identified by two signals, each of which have a unique combination of signal durations. Once a track to be accessed has been located by measuring the durations and comparing same with the indicated track type, track following operations proceed. This is preferably achieved using integration techniques. The readback signals, as represented in FIG. 3A, are first rectified, then integrated. The integration time constant of the integrators is adjusted in accordance with the signal durations; that is, in integrating signal 1A, the integrator is assigned a shorter time constant than integrating signal 2A. An effect of these differing integration times is to neutralize the effects of the burst duration times, as well as normalize readback signal amplitudes for adapting the servo apparatus to signal perturbations. Integration for the first signal is preferably the inverse of the integration of the second group signal such that on a track centered position, the resultant net integrated signal is zero, and the signal of the any net integration signal indicating direction and magnitude of position error. During track following operations, the track seeking portion of the servomechanism is preferably kept in the active state for yielding transducer radial position corrections as may be necessary by large disturbances in the servomechanism, which may cause the transducer to move radially off-track. The active track seeking portion can quickly recover from such an error for maximizing data throughout during signal exchanging operations with the record member.

A PREFERRED IMPLEMENTATION

Figure 4:
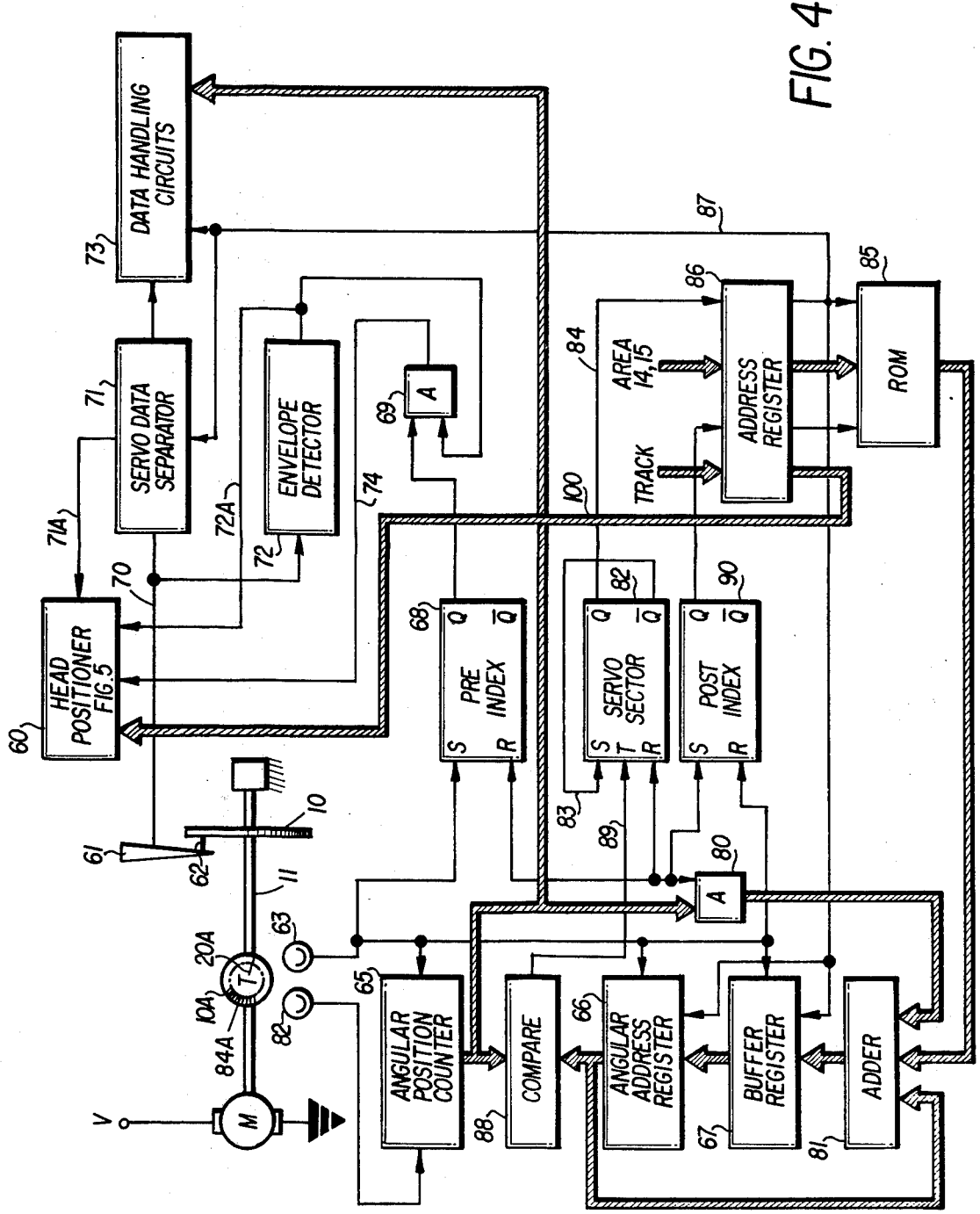
FIG. 4 is a simplified logic flow diagram of apparatus which incorporates the present invention.

One implementation of the invention is shown in FIG. 4. The description assumes that head positioner 60 has moved head support arm 61 into transducer access such that transducer head 62 (corresponding to head 12 of FIG. 1) is scanning a desired track to be accessed. Such track seeking operations will be detailed later with respect to FIG. 5. The description also assumes a separate tachometer disk 10A having a fixed angular position to disk 10 such that tachometer fiducial mark 20A precedes radial index line 20 by a small angle. The description starts with photosensing unit 63 sensing the tachometer index mark 20A for supplying a tachometer index signal over line 64 to reset the angular positioning sensing and controlling circuits which include resetting angular position counter 65, angular address register 66, and buffer register 67. Additionally, pre-index flip-flop 68 was set to the active condition signifying that transducer 62 is scanning an erased portion prior to the disk radial index line 20 (FIG. 1). Pre-index flip-flop 68 conditions AND circuit 69 to respond to a signal signifying detection of the disk fiducial line 20 signal to supply a disk index signal over line 74.

The disk index signal and all other control signals are produced initially by transducer 62 sensing the signals represented by the FIG. 1 illustrated format and supplying same over line 70 to servo and data signal separator 71 and to envelope detector (amplitude sensor) 72.

Servo and data signal separator 71 supplies the servo-separated signals to head positioner 60 for enabling transducer 62 to faithfully scan the track being accessed. Additionally, separator 71 supplies the separated data signals to data handling circuits 73 for processing in a known manner. Techniques of data handling circuits 73 bear no significance on practicing the present invention and, hence, are omitted for purposes of brevity. Envelope detector 72, upon receiving the signal generated by transducer 62 corresponding to disk fiducial line 20, supplies an active signal to AND circuit 69. AND circuit 69 was conditioned by pre-index flip-flop 68 to pass the envelope detector 72 signal to line 74 as a disk index signal. This action corresponds in time with transducer 62 scanning radial index line 20.

In preparation for normalizing the content of angular address register 66 to the record areas 14 and 15 in which 62 is scanning a given track, the disk index signal conditions AND circuits 80 to pass the signal content of angular position counter 65 to adder 81. The angular location of servo sectors 16 differs from servo sectors 17; hence, the angular position indicator circuits are automatically adjusted or normalized to either area 14, 15. Photosensing unit 82 senses the tachometer marks 84 and supplies tachometer signals to increment the content of angular position counter 65. At the time disk index signal occurs, the signal contents of angular position counter 65 is $N_0$, the known augular displacement between tachometer index 20A and radial index line 20. These signal contents are supplied through adder 81 to buffer register 67 in preparation for insertion into angular address register 66.

Insertion of the augular position counter signal contents into angular address register 66 is now described. The disk index pulse on line 74 also resets servo sector trigger flip-flop 82. As a result, an activating signal travels over complement output line 83 which, in turn, causes the servo sector trigger to be set; i.e., it acts as a monostable multivibrator. As such, a negative pulse is supplied over line 84 to read-only memory 85 input address register 86. A portion of address register 86 contains track addresses which are supplied to head positioner 60 over cable 100 to be used as later described. One position of register 86 indicates whether head 62 is scanning servo signals or data signals. This indicating signal is supplied over line 87 to ROM 85 for addressing, as will be latter described, to servo data separator 71 and to data handling circuit 73. Additionally, this negative pulse strobes signals into buffer register 67 and angular address register 66. Hence, the $N_0$ signals go to buffer register 67 and angular address register 66. This action is so fast that angular position counter 65 has not yet counted past the $N_0$ tachometer counters. Hence, digital compare circuit 88 indicates a compare successfuly signal on line 89 to trigger servo sector trigger 82 to the reset state indicating "not-servo" time.

Additionally, the disk index signal on line 74 sets the post index flip-flop 90 to the active condition. This action forces a binary 1 into address register 86. Then, as set forth in the table below, the addresses of register 86 access one of the five register in ROM 85. The addresses are set forth in the lefthand column, wherein the X's indicate "don't cares", and the content of the registers is in the righthand column. In the ROM address, the middle symbol indicates the area ((14=A, 15=B), the lefthand symbol indicates the activity of the post index flip-flop, and the righthand symbol indicates the activity of the servo sector trigger 82. Each time trigger 82 is triggered by a signal on line 89, it acts as a monostable multivibrator for the duration of the servo time such that the appropriate numerical content of the registers is supplied through adder 81 to buffer register 67 and angular address register 66.

| ROM ADDRESS TABLE | |
|---|---|
| Address | Content |
| 0XX | $N_0$ |
| 1A0 | $N_{ja}$ |
| 1A1 | $M_{ja}$ |
| 1B0 | $N_{jb}$ |
| 1B1 | $M_{jb}$ |

The terms $N_{ja}$ and $N_{jb}$ represent the angular extents of servo sectors, while $M_{ja}$ and $M_{jb}$ represent the angular extents of data sectors respectively in areas 14 and 15.

Each time servo sector trigger 82 is triggered by compare 88, the signal contents of address register 86 of ROM 85 are transferred to adder 81 and added to the contents of angular address register 66 for updating the angular address for the next data sector or the next servo sector, as the case may be. The above action is repeated for the duration of the track. A recurrence of the tachometer index signal on line 64 restarts and recalibrates the angular addressing of the track. Hence, even with error conditions, there is automatic recovery because of this automatic recalibration. Construction of the ROM can be using known read-only memory techniques, such as capacitive memories, conductive memories, mechanical pinboards, electrically settable flip-flops, and the like.

Figure 5:
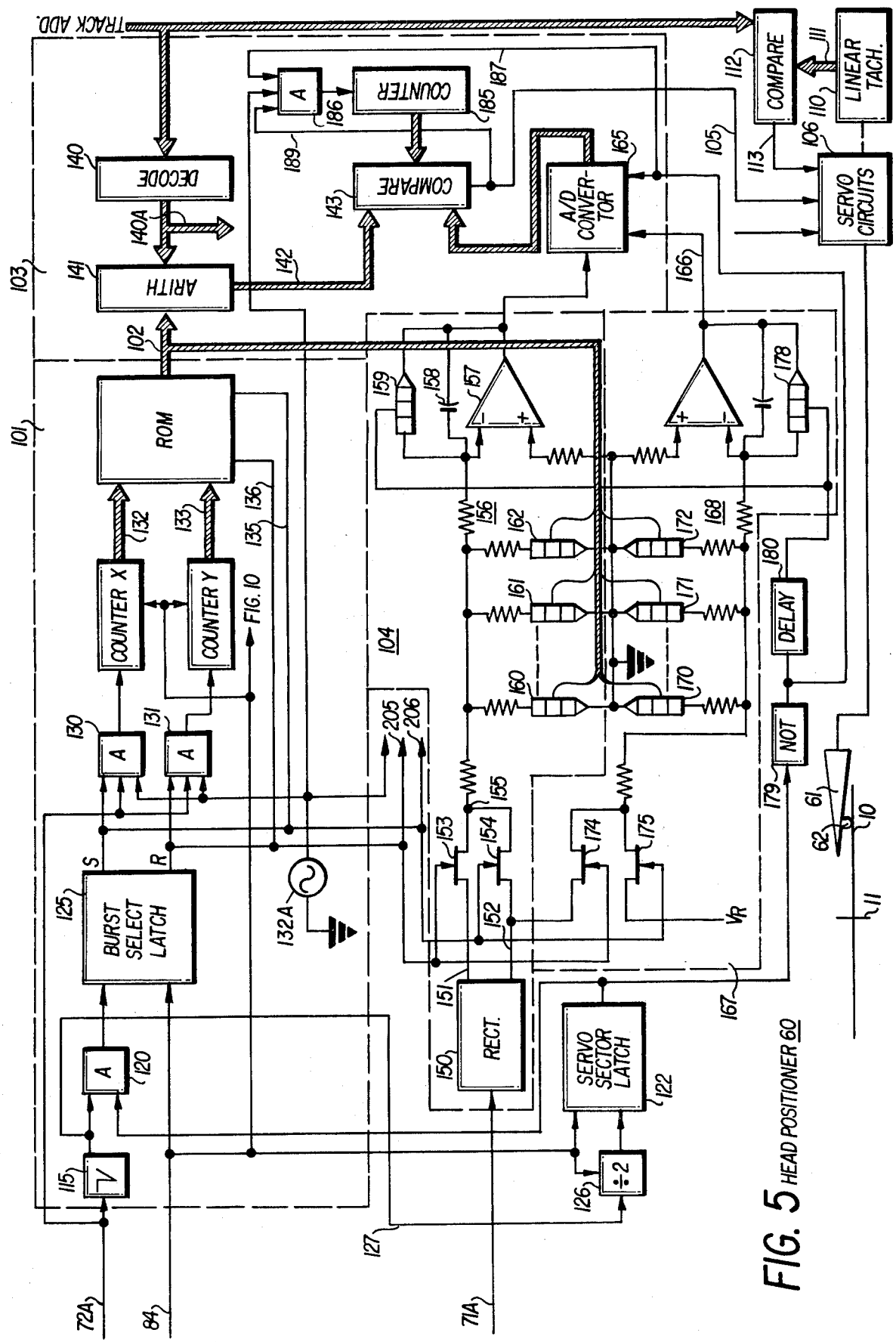
FIG. 5 is a combined logic flow and schematic diagram illustrating the operation of the present invention and shows apparatus usable with the FIG. 4 illustrated apparatus.

Referring to FIG. 5, the constructional features of the head positioner 60 are next described. Head positioner 60 performs two functions. The first function ascertains the track number within any group of six tracks, whether it be A–F. The second function is following an addressed track. The arrangement is such that both functions can be performed simultaneously such that a perturbation in track following automatically invokes track setting for rapid automatic track positioning error recovery.

The track seeking function is implemented by burst length comparator circuit 101, which supplies its output signals over cable 102 to pulse width modulator circuit 103. Pulse width modulator (PES Generator) 103 combines the outputs from track seeking circuit 101 and the track following circuit 104 to supply a servo controlling position error signal (PES) over line 105 to servo-mechanism circuits 106 which, in turn, position head carrier 61 with respect to record storage disk 10. It is to be understood that head 62 has been positioned within the group of tracks by a coarse positioning circuit including a linear tachometer 110 affixed to head support 61 and providing positioning signals over cable 111 to compare circuits 112. The track address and the actual linear tachometer indicated address are compared by circuits 112 to supply a coarse position error signal over line 113 to servo circuits 106 to initially coarse position transducer 62 radially with respect to disk 10. Servo circuits 106 may include dual mode circuits which are selectively responsive to either the 113 line signal indicating a coarse error or the line 105 signal indicating a fine position error. It is to be understood that the 113 coarse position error will override the fine position error signal on line 105. Known multimode servomechanism techniques may be used for such selection.

Returning now to the description of circuits 101, the envelope indicating signal received from envelope detector 72 (FIG. 4) over line 72A is differentiated by negative transition differentiator 115. Each time the envelope falls in amplitude (as at the end of the burst of signals as indicated by lines 116 and 117 of FIG. 3), circuit 115 supplies an actuating pulse to AND circuit 120. AND circuit 120 supplies these negative end-of-burst indicating signals only during the sector servo time. To achieve this result, the servo sector pulse on line 84 sets servo sector latch 122 to the active condition and simultaneously sets burst select latch 125 to the active condition. Burst select latch 125 being set indicates that the signal being received is in the first-appearing burst in the first group of servo signals bursts. The line 84 signal leading edge also resets divide-by-two circuit 126 priming it for resetting the servo sector latch to signify the end of the servo sector. For each servo sector, as shown in FIG. 3, circuit 115 supplies two negative pulses over line 127 to divide-by-two circuit 126 corresponding, respectively, to burst ends 116 and 117. The divide-by-two circuit, upon receiving the second negative pulse corresponding to burst end 117, resets servo sector latch 122 (data time is indicated). Accordingly, burst select latch 125, when in the set state, signifies the first group burst is being read; while in the reset or second state, signifies a second group of servo signals could be read.

It is remembered that the duration of the respective bursts signifies which track is being sensed. A pair of AND circuits 130 and 131 respond respectively to the burst select latch 125 being set and reset to supply pulses from timing oscillator 132 to actuate counters X and Y for metering servo signal duration. Initially, the leading edge of the line 84 pulse resets both counters to a reference state. Accordingly, as long as the line 72A envelope indicating signal is active, either AND circuit 130 or 131 will supply pulses to the two counters for metering the durations of the first or second group signal bursts. Counters X and Y act as digital integrators with memory for metering the elapsed time. Each of the counters supply their respective output signals over cables 132 and 133 to read only memory (ROM) decoder. The signals on cables 132 and 133 correspond to unique addresses within ROM at which there are stored the track numbers A–F for a band of six tracks. The inner band track address is determined in combination with the burst select latch 125 output signals indicating that the second burst has been successfully read. When burst select latch 125 is set to the initial condition, a leading edge pulse traveling over line 135 causes an output register (not shown) in ROM to be reset. Similarly, a negative-going pulse traveling over line 136 signifying burst select latch 125 being reset causes the signal contents of the addressed register in ROM to be inserted into the output register for then being supplied over cable 102 to pulse width modulator 103.

Pulse width modulator 103 includes a track position detector having a track decoder 140 which receives track addresses from register 86 (FIG. 4) and converts same into addresses A–F for within band track addressing. An arithmetic comparator 141 responds to the actual address on cable 102 and to the decoded track address signals from decode 140 to supply track number error signals over cable 142 to compare circuit 143. As will be later described, compare circuit 143 responds to the track number error signals on cable 142, pplus the off-track position error signals from a properly addressed track, i.e., when the signal on cable 142 indicates correct track, to supply a pulse width position error signal PES over line 105.

Once transducer 62 has been properly positioned over a track, track following circuits 104 cause the transducer to faithfully follow the track center or location lines in accordance with the relative amplitude measurements generated by a gap 24 scanning the respective bursts, as shown in FIG. 3 and as will be described in detail with respect to FIGS. 5–9. Track following circuit 104 receives the servo sector signals over line 71A from separator 71 (FIG. 4). Such signals may be equalized, but are not otherwise processed in order to maintain precise amplitude indications sensed by transducer 62. Rectifier 150 full-wave rectifies received servo signals and supplies positive and negative output signals, respectively, over lines 151 and 152. Field effect transistor (FET) 153 transfers the positive signal on line 151 during the first servo signal burst (first group), as indicated by burst select latch 125 to summing node 155; while FET 154 supplies a negative signal from line 152 during the second group signal burst, also as indicated by burst select latch 125. Both signals pass node 155 to bipolar integrator 156. Integrator 156 includes differential amplifier 157, integrator capacitor 158, squelch control transistor element 159, and time constant controlling transistor-type switches 160–162. The ROM supplies track address signals over cable 102 to control the time constant switches 160–162 for altering the integration rate to balance the integrations in accordance with the desired amplitudes. That is, as shown for track D′ in FIG. 3, the first burst in group 17A ending at 116 ideally has a one-half amplitude signal, while the second group signal ending at 117 has a full amplitude signal. For properly indicating track centering of gap 24 with respect to track D′, the integrated amplitude versus time for both successive signal bursts should be made equal. This allows the servoing to null at the track location line and facilitates servo positioning control. This action is achieved by varying the integration rate, as will be described.

Figure 6:
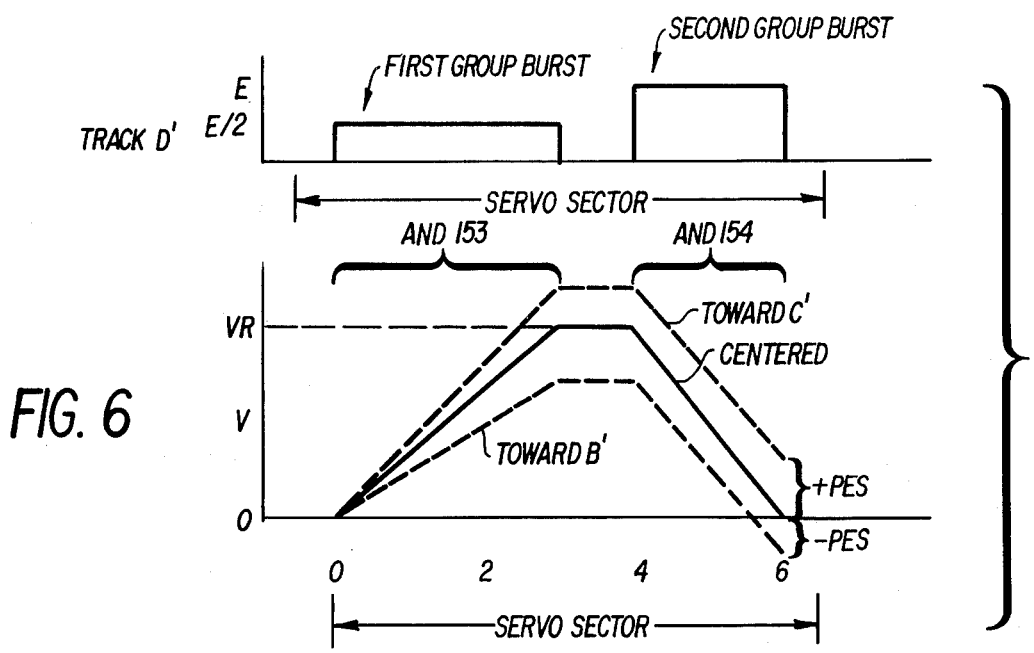

The above balancing is better understood by referring to FIG. 6. The track D′ centered idealized servo readback signals are shown in the top view wherein the burst signal from the first group servo signal has one-half amplitude, and the burst signal from the second group servo signal has a full amplitude readback. To equalize the time-amplitude integral, the time constant imposed on integrator 156, when FET 153 is supplying its signal, is three-fourths that used for the second group servo signal. For example, the first group burst signal ending at 116 has 12 units of amplitude-time integration, while the second group signal ending at 117 has 16 amplitude-time units of integration. To balance the resultant integration values (the area under the curves) based upon common constant reference value VR, the first group signal ending at 116 is integrated at three-fourths the rate of the second group signal. Calculation shows that the two integrations are then equal; and if substracted one from the other, the PES should be zero. As shown in FIG. 6, when gap 24 is disposed more toward track location line C′ than the track D′ center line, a positive PES signal results; whereas, if gap 24 is disposed toward track location line B′, a negative PES signal results.

The switch settings for the various track addresses within a six-track band are given in the table below for the three time constant determining switches of integrator 156. Switch settings are for integrating the first group signals and the second group signals. A binary 0 indicates a switch is open (no current flows) and a binary 1 indicates the switch is closed (current flows). For a greater number of track within a band, a greater number of switches are provided.

TABLE I

| Track | First Group Settings | | | | Second Group Settings | | | |
|---|---|---|---|---|---|---|---|---|
| | Time Constant | 160 R | 161 R/2 | 162 R/2 | Time Constant | 160 R | 161 R/2 | 162 R/6 |
| A′ | 2 | 0 | 0 | 0 | 8 | 0 | 0 | 1 |
| B′ | 4 | 0 | 1 | 0 | 3 | 1 | 0 | 0 |
| C′ | 3 | 1 | 0 | 0 | 3 | 1 | 0 | 0 |
| D′ | 3 | 1 | 0 | 0 | 4 | 0 | 1 | 0 |
| E′ | 8 | 0 | 0 | 1 | 2 | 0 | 0 | 0 |
| F′ | 2 | 0 | 0 | 0 | 2 | 0 | 0 | 0 |

The integrator 156 accumulates the amplitude-time integral as above described and supplies same to analog-to-digital converter 165 in pulse width modulator 103. Converter 165 supplies a digitized version of the position error signal PES to be used as later described. Converter 165 also responds to a normalizing signal received over line 166 from amplitude normalizing circuit 167, which provides automatic gain control for adjusting the position error signal to be normalized irrespective of amplitude perturbations of the readback signal. That is, during a first read operation of the servo sector, a first amplitude of, for example, 2.75 millivolts, may be read. After an elapsed time of several hours, the temperature of the apparatus may change; for example, the temperature may increase. As a result, the signal amplitude increases because of decreased transducer-to-medium spacing, for example, up to 2.85 millivolts. Operation of the positioning servo should be insensitive to such perturbations. Accordingly, converter 165 responds to the line 166 reference signal for adjusting the conversion, i.e., gain of the signal, in a known manner.

Normalization circuit 167 includes an integrator 168 identical to integrator 156.

The time constant switch settings for switches 170, 171, and 172 are shown in Table II below, with the first group settings indicating reading the full amplitude first group servo signal; while the second group settings indicate the time constant switches for reading the full-amplitude signals occurring in the second group of servo signals.

TABLE II

| Track | First Group Settings | | | | Second Group Settings | | | |
|---|---|---|---|---|---|---|---|---|
| | Time Constant | R | R/2 | R/6 | Time Constant | R | R/2 | R/6 |
| A′ | X | X | X | X | 8 | 0 | 0 | 1 |
| B′ | 4 | 0 | 1 | 0 | X | X | X | X |
| C′ | 3 | 1 | 0 | 0 | 3 | 1 | 0 | 0 |
| D′ | X | X | X | X | 4 | 0 | 1 | 0 |
| E′ | 8 | 0 | 0 | 1 | X | X | X | X |
| F′ | 2 | 0 | 0 | 0 | 2 | 0 | 0 | 0 |

The X's signify that the integrator is not used because the corresponding servo signal is a half-amplitude signal, while the other servo signal is a full-amplitude signal.

Normalization or reference circuit 167 also receives signals via a pair of FET's 174 and 175 respectively activated by the set and reset output signals of burst select latch 125. Circuit 175 passes the voltage reference VR during the reset phase of burst select latch 125, while FET 174 supplies the negative signal from line 152 to integrator 168 during the first portion of the servo signals. In this manner, the full-amplitude signal received from rectifier 150 is compared in integrator 168 with $V_R$. The net difference of the two integrations is supplied over line 166 to converter 165 for normalizing the analog-to-digital conversion, as previously mentioned. Integrator 168 is squelched by transistor element 178 in response to the signal from servo latch 122 going negative as determined by the NOT circuit 179 and delay 180.

Figure 9:
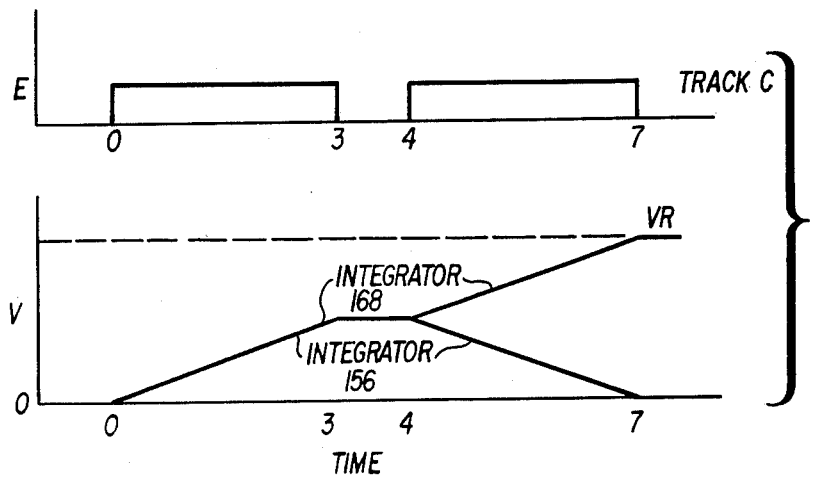
FIGS. 6-9 show simplified signal and integration waveforms illustrating the operation of the FIG. 5 illustrated apparatus for various signal and position conditions.
Figure 7:
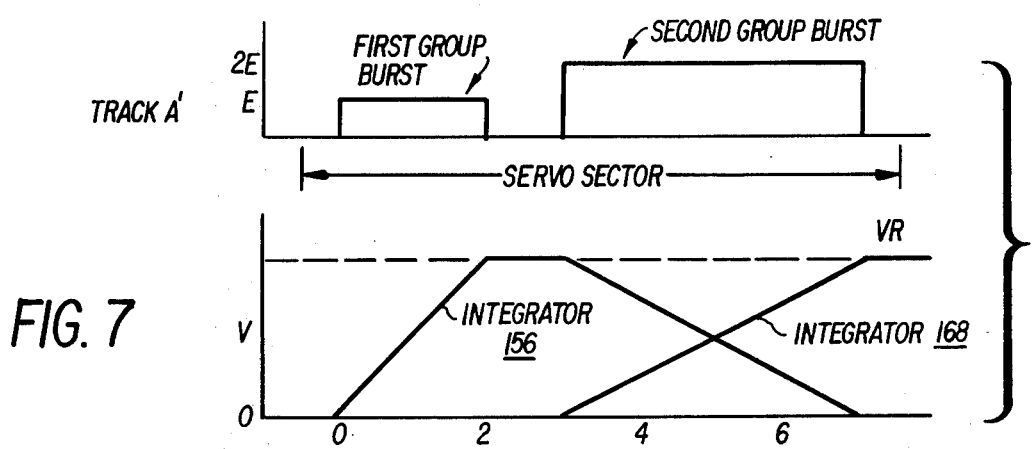
Figure 8:
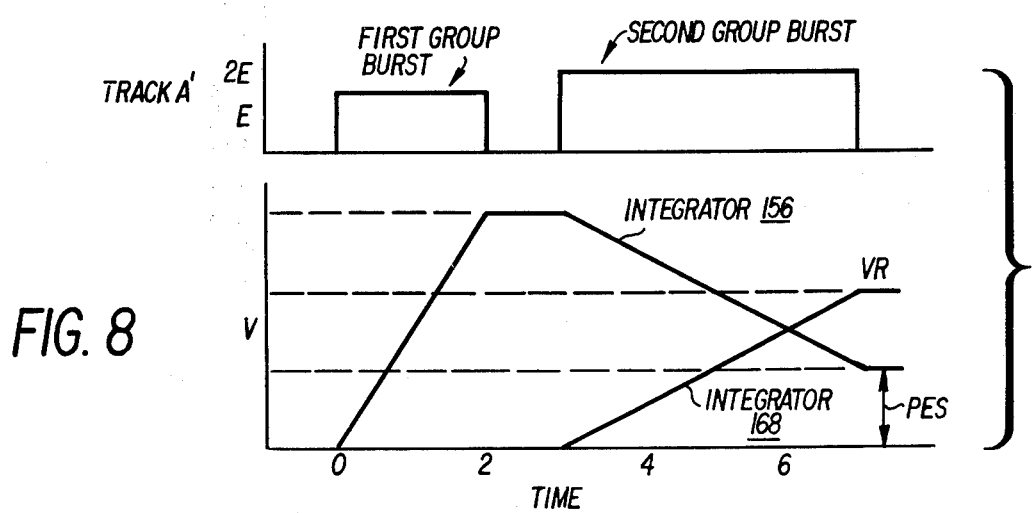

Coaction of normalization circuit 167 and track following circuit 104 is better understood by referring to FIGS. 7, 8, and 9. In FIG. 7, track A' is shown having a first group half-amplitude signal followed by a second group full-amplitude signal. The integrator 156 signal and the integrator 168 signal are shown. FIG. 8 shows track type A' which is offset from track center with the signals from integrators 156 and 168 shown in the bottom portion of the figure. Note that VR is the same amplitude and, at PES, is adjusted upward.

FIG. 9 shows the operation when two half-amplitude servo signals are provided for track type C. Again, the integrated values for integrators 156 and 168 are shown.

Pulse-width modulator 103 responds to the converter 165 output value and the digital value from arithmetic comparator 141 to generate variable pulse widths on line 105 in accordance with the digital difference between the signals on cable 142 and the output of converter 165. To this end, counter 185 is activated by AND circuit 186 to count up to the difference value of compare 143. When the value in counter 185 equals the values of signals supplied by cables 142 and converter 165, an output pulse is terminated thereby yielding a pulse-width representation of digital values on cables 142 and converter 165. To this end, AND circuit 186 passes the oscillator 132A pulses for tallying time in counter 185. The signal on line 187 from NOT circuit 179 activates AND 186 jointly with a positive output from compare 143 received over line 189. Therefore, as soon as a compare is successful between counter 185 and the values on cable 142 and converter 165, the signal on line 105 decreases. This decrease is transferred over line 189 disabling AND circuit 186 thereby stopping counter 185. Stopping counter 185 automatically resets same in accordance with known techniques.

MULTIPLE FREQUENCY TRACK DISCRIMINATION

A further advantage can be provided by discrimination between sub-bands of tracks defined by multiple frequency servo signals. For example, tracks A' and B' may be respectively recorded at frequencies F1 and F2. Such frequency difference can be used to further distinguish and discriminate between the servo signals and thereby more reliably identify the tracks. The servo signals received from separator 71 (FIG. 4) over line 71A are given to filters 195 and 196 (FIG. 10), respectively, for frequencies F1 and F2. The outputs of the filters respectively go to rectifiers 197 and 198 corresponding to the full-wave rectifier 150 of FIG. 5. In this instance, the tracks A', C', and E' are rectified by rectifier 197; while the servo signals from tracks B', D', and F' are rectified by rectifier 198. The outputs of the rectifiers can be limited by limiters 200 and 201, respectively, and supplied to circuit 101 to be pulse-width measured as previously described. Additionally, the rectifiers 197 and 198 supply their output signals to differential amplifiers 203 and 204 to be compared with a voltage reference VR1. The output of differential amplifiers 203 and 204 drives the switching network and decoder in accordance with burst select signals from burst select latch 125 received, respectively, over lines 205 and 206. Decode circuit 207 responds jointly to the signals from differential amplifiers 203 and q204 and the signals on lines 205 and 206 to indicate the track address over cable 208. The signals on cable 208 are then compared with the decoded address from cable 140A from decoder 140 in compare circuit 209 to supply control signals to the pulse-width modulator 103 over cable 142A. Track following is as previously described.

The principle of multiple frequency track discrimination is equally applicable to the track patterns illustrated in FIG. 2. In this particular situation, providing a pattern of differing frequencies and combining same with the triplet amplitude coding (three-track identification or discrimination), the band of identifiable tracks is expanded from three to 24, an eight-fold increase. If two frequencies F1 and F2 are recorded in the FIG. 2 illustrated patterns, the band shown in FIG. 11 results wherein the numerals 30, 31, and 32 correspond to the numerals in FIG. 2 for identifying the columns of servo bursts extending transverse to the length of the tracks. Track numbers for a given band are shown in the lefthand column. Resultant readback signals for each of the tracks, when the transducing gap is centered over the track location line, are shown in the righthand portion with the numerals of the track, 1-24, also identifying the readback signals. The frequencies of the differing bursts are shown underneath the envelope waveform. Examination of the signal bursts in columns 30, 31, and 32 shows a binary progression. Column 32 has the least significant binary digit representation, wherein every other burst is F1, F2. Column 31 has the second digit position of a binary sequence, wherein two successive bursts have the same frequency. Finally, column 30 has the third digit position. It is understood that other combinations of frequency assignments can also be employed with advantageous results. For example, gray coding may be employed or an arbitrary pattern may also be designed.

The illustrated frequency burst geometric arrangement provides for hemibands, quadribands, and octabands. The table below illustrates the relationship of the tracks to the frequency and amplitude identifiers.

TABLE III

| Track | Frequency | Amplitude |
|-------|-----------|-----------|
| 1 | 111 | 121 |
| 2 | 111 | 112 |
| 3 | 111 | 211 |
| 4 | 112 | 121 |
| 5 | 112 | 112 |
| 6 | 122 | 211 |
| 7 | 121 | 121 |
| 8 | 121 | 112 |
| 9 | 121 | 211 |
| 10 | 122 | 121 |
| 11 | 222 | 112 |
| 12 | 212 | 211 |
| 13 | 211 | 121 |
| 14 | 211 | 112 |
| 15 | 211 | 211 |
| 16 | 212 | 121 |
| 17 | 212 | 112 |
| 18 | 222 | 211 |
| 19 | 221 | 121 |
| 20 | 221 | 112 |
| 21 | 221 | 211 |
| 22 | 222 | 121 |
| 23 | 122 | 112 |
| 24 | 112 | 211 |

Inspection of the above table shows that the triplet amplitude coding corresponds to the frequencies in the rightmost column of the frequency tabulation. That is, in tracks 1, 2, and 3, F1 is in the rightmost column corresponding to the first triplet; tracks 4, 5, and 6 have frequency F2 corresponding to a second triplet, etc. The center column of frequencies represents quadribands (logical, not physically contiguous), wherein each band of tracks 1-24 can be divided into four groups of tracks as follows: 11 represents tracks 23, 1-5; 12 represents tracks 6-10, 23; 21 represents tracks 12-17; and 22 represents tracks 18-22, 11. Finally, the leftmost column of the frequency tabulation defines the hemibands, wherein frequency F1 defines tracks 23, 24, 1-10; while frequency F2 represents tracks 11-22. The octabands correspond to the triplet amplitude coding groups as mentioned above.

Providing a two-frequency modulation of the three group sector servo blocks increases the band extent from three tracks to 24 tracks. While this change is an amazing increase, a more significant result is the increase in off-track recovery capabilities. That is, once the apparatus is in a track following mode, errors may cause the following transducer to move completely away from the track being followed — an off-track error. The positioning pattern ideally enables the apparatus to automatically find the track being followed without going to a track seek mode or other time-consuming error recovery procedures. Without the frequency additions, off-track recovery capability is ± one track. With the invention frequency addition, off-track recovery increases to ± 11½ tracks. Yet another improvement is a reduction in total track seek time.

FIG. 12 diagrammatically illustrates an implementation of the FIG. 11 illustrated track identification patterns. It is to be understood that coarse positioning places the transducer 62 within a band. Tertiary controls can select one of the subbands mentioned above. The coarse positioner is actuated by receiving a desired address over cable 220 and decoding same in adder and stepper logic block 221. A control signal flows over line 222 to stepper motor 223 which operates based upon comparison of the received signals with a tachometer system (not shown) well known in the art. The stepper motor moves the assembly 225 to a predetermined coarse positioning location corresponding to a predetermined number of tracks, i.e., may be plus or minus ten tracks, for example. A second carriage 226 mounted for movement on assembly 225 supports head arm 61 for moving head 62 to the desired tracks within the constraints of a single group of tracks, such as ten or 24. The latter operation is performed by sensing signals supplied by head 62 through preamp equalizer and separator 71 with the output servo signals being supplied over line 227. Servo sector gating is achieved as aforedescribed using tachometer 10A, which co-rotates with disk 10 about spindle 11. Tachometer signals flow over line 228 to counter 65A and to disk initialization circuits 230. The disk initialization circuits are those described with respect to FIG. 4 wherein counter 65A corresponds to angular index counter 65 of the FIG. 4 illustration. The count of angular position indicated by counter 65A is supplied to track code logic and ROM 231 which operates in the same manner as described previously for FIG. 4. The track location and error are respectively supplied over lines 232 and 233 to adder and stepper logic 221 which, in turn, supplies the error signals over 222 to motor 223.

Figure 10:
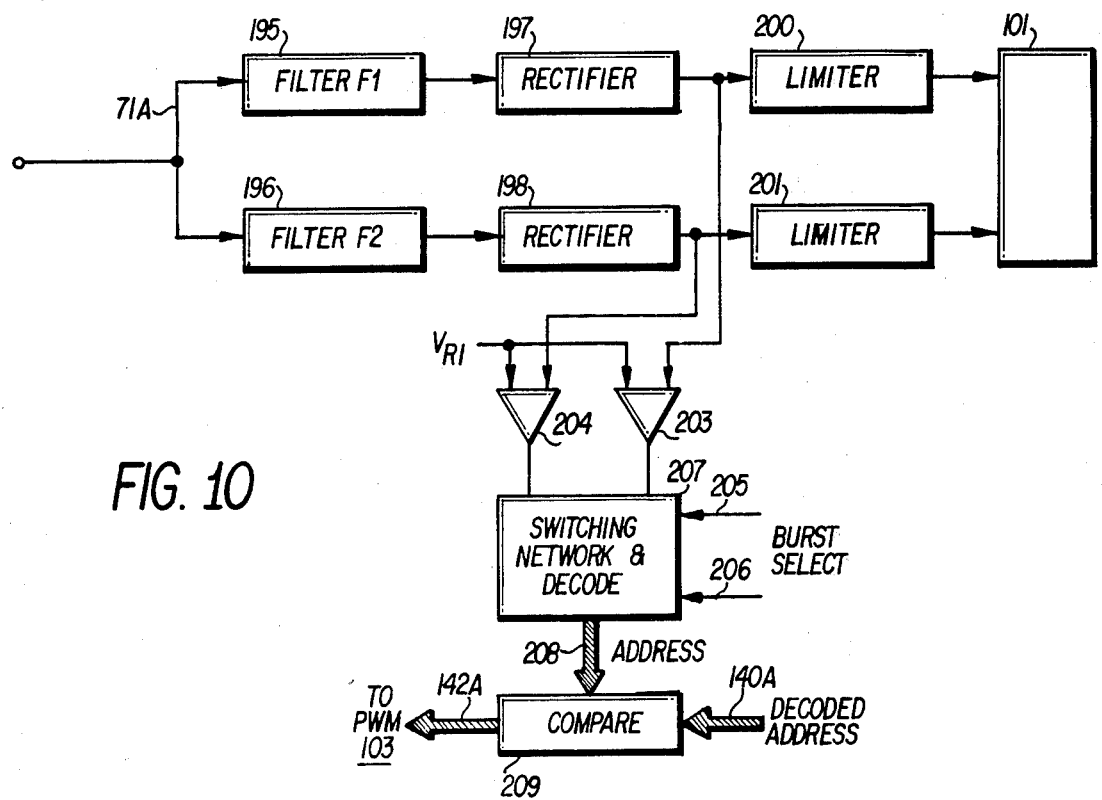
FIG. 10 is a simplified logic flow diagram of a modification of the FIG. 5 illustrated apparatus for incorporating a two-frequency discriminator function in the servo patterns.

Further, the servo signals on line 227 actuate track following circuits 235 as previously described with the PES signal being supplied over line 236 to carriage 226 which includes servomechanisms. Further, the following circuits supply a track-centered indicating signal over line 238 to decode 231 which can inhibit track seeking operations or indicate that track seeking can be momentarily dispensed with. Further, the multiple frequencies of servo signals also travel to frequency discriminator and comparator 240 which is constructed similar to the apparatus shown in FIG. 10. The detected frequencies F1 and F2 respectively travel over lines 241 and 242 to decode 231. Decode 231 decodes the F1 and F2 signals in a time domain as described and shown in Table III. The principles shown in FIG. 10 are applicable to the design of decode 231. Further, disk initialization circuits 230 supply gating signals over line 243 for controlling and timing the operations of circuits 235 and 240.

While the invention has been particularly shown and described with reference to a preferred embodiment thereof, it will be understood by those skilled in the art that various changes in form and detail may be made therein without departing from the spirit and scope of the invention.

What is claimed is:

1. A record member having means for identifying track locating lines for locating parallel record tracks, respectively, said lines being spaced a given distance; improved track locating line identification patterns, including in combination:

first and second groups of servo signals aligned transversely to said lines and said groups disposed longitudinally along said lines;

each servo signal having an extent transverse to said lines of about said given distance and having differing durations such that servo signals of shorter durations in one of said groups are longitudinally adjacent servo signals of longer durations in another of said groups; and predetermined ones of said servo signals abutting one of said locating lines and other predetermined ones of said servo signals being centered on said locating lines.

2. The subject matter set forth in claim 1 wherein first ones of said servo signals exhibit a first signal characteristic, second ones of said servo signals exhibit a second signal characteristic sensibly different from said first characteristics, and said first ones of said servo signals being interleaved between said second ones of said servo signals in each of said groups.

3. The subject matter set forth in claim 2 wherein said first and second signal characteristics are first and second signal frequencies, respectively; and said servo signals being spaced apart transverse to said track locating lines a distance equal to about one-half the pitch distance between adjacent ones of said track locating lines, said track locating lines being equally spaced apart.

4. The subject matter set forth in claim 1 wherein said servo signals in said first group have repetitive matter of six track locating lines wherein a first signal of said first group being a shorter one signal and disposed between adjacent track locating lines, a second signal of said first group signal being spaced from said first signal of said first group one-half distance between two adjacent ones of said track locating lines and said second signal of said first group being centered on a third one of said track locating lines, a third one of said first group signals being disposed between fourth and fifth ones of said track locating lines and being spaced from said second signal of said first group one-half distance between said third and fourth track locating lines, said third signal of said first group having a duration along the length of said track locating lines greater than said first and second ones of said signals in said first group; and a fifth servo signal in said first group centered on a sixth one of said track locating lines and being spaced from said fourth servo signal one-half the distance between said fifth and sixth track locating lines;

a first signal of said second group being centered on said second track locating lines and being spaced one-half the distance, respectively, from said first and third track locating lines, a second signal in said second group being disposed between said third and fourth track locating lines, said first signal of said second group having a duration longer than any other signal in said second group, said second signal of said second group having a duration slightly less than said first signal of said second group, a third signal in said second group being centered on said fifth track locating line and having a shorter duration and being spaced from said fourth and sixth track locating lines one-half the distance from those lines to said fifth line, respectively, a fourth signal in said second group being disposed between sixth and seventh track locating lines and having a shorter duration of said signals in said second group; and a leading edge of said first group signals being in a line transverse to said track locating lines and a trailing edge of each signal in said second group being aligned transverse with respect to said track locating lines.

5. The subject matter of claim 4 wherein said tracks are concentric on a rotatable record member and said pattern being disposed circumferentially of said member along said tracks, respectively, and being spaced apart forming a plurality of servo sectors about said member, with said pattern being repeated radially of said member whereby bands of six tracks are uniquely identifiable by said pattern with data spaced being disposed between said servo sectors.

6. The subject matter set forth in claim 1 wherein said transversely disposed adjacent ones of said servo signals in said groups, respectively, having different frequencies of recording for increasing track discrimination; and maximum spacing between adjacent ones of said servo signals in said groups, respectively, being not greater than one-half the distance between adjacent parallel track locating lines.

7. A record member having a plurality of parallel signal tracks, said tracks being divided into bands of tracks spaced apart a given distance;

said record member having track location indicator means including in combination:

two groups of signal bursts recorded on the member for indicating a given number of track location lines and disposed along the length of the identified tracks in closely spaced relation;

said signal bursts in a first of said bands being aligned transversely to the lengths of said center lines and being spaced apart about one-half said given distance with aligned leading edges;

said signal bursts in a second of said bands being aligned transversely to the lengths of said center lines and being spaced apart about one-half said given distance and having aligned trailing edges; and said signal bursts in said bands being in alternate pairs of one signal burst from each group centered on adjacent ones of said location lines and disposed on opposite sides of a given one of said locating lines and abutting said given one center lines, respectively.

8. The subject matter set forth in claim 7 wherein said groups of signal bursts are spaced apart along the lengths of said track location lines for enabling recording data signal intermediate adjacent ones of said signal groups; and said track location lines defining centers of data tracks extending between adjacent ones of said groups such that a transducing gap sensing said servo signals can also sense and record data signals.

9. The subject matter set forth in claim 8 wherein said member is a circular disk and said parallel signal tracks are concentrically disposed on said disks;

signal bursts in one of said groups having different signal frequencies in adjacent ones of said bursts for enhancing track discrimination and arranged such that the number of tracks in the band is increased over that provided by a single frequency in all of said signal bursts.

10. A record member having identifying track locating lines for addressing parallel record tracks, improved track locating line identification patterns, including in combination:

a plurality of servo signals aligned transversely to length of said locating lines, for each track locating line there being a plurality of longitudinally spaced servo signals, one of which is substantially symmetrically disposed about said each track locating line and another one of which substantially abuts said each track locating lines; and said servo signals for predetermined ones of said track locating lines being of differing durations along the track length.

11. The subject matter set forth in claim 10 wherein said servo signals are arranged in groups transverse to said track locating lines; and durations of servo signals in a first of said groups having complementary lengths to servo signals disposed in a second one of said groups whereby the longitudinal extent of both said groups along said track locating lines being constant for all of said track locating lines.

12. The subject matter of claim 10 wherein the spacing between adjacent ones of said servo signals is about one-half the pitch between adjacent ones of said track locating lines.

13. The subject matter of claim 10 wherein each said servo signal includes a constant frequency portion, with a frequency different than an adjacent one of said servo signals.

14. The subject matter of claim 13 wherein said differing frequencies extend transversely to said track locating lines; and said pattern of durations repeating a predetermined number of track locating lines and the uniqueness of repetitiveness transverse to said track locating lines being extended by said multifrequency characteristics of said bands.

15. The subject matter of claim 10 wherein said record member is a circular disk with said track locating lines being concentric and directions transverse to said lines being radial; and said plurality of servo signals occupying a limited circumferential space on each of said track locating lines with said plurality being repeated circumferentially around said member in spaced-apart relationships for enabling recording of data signals circumferentially intermediate adjacent ones of said plurality of servo signals.

16. A record member having a pluarlity of servo sector areas for identifying a plurality of record track location lines, the improvement including in combination:

a plurality of spaced-apart servo signal burst groups extending along said track location lines in each said servo sector areas and said groups extending transversely to said track location lines and having servo signal bursts apart transversely to said track location lines, said groups yielding a repetitive geometric pattern along a direction transverse to said track location lines; and said servo signal bursts respectively having a plurality of signal characteristics distributed respectively in each servo area in accordance with a predetermined pattern whereby said pattern of signal characteristics and said geometric pattern yield a repetitive pattern encompassing a number of track location lines substantially greater than a number of track location lines encompassed by said first-mentioned repetitive pattern while providing enhanced off-track recovery.

17. The record member set forth in claim 16 wherein said signal characteristics include a pluarlity of signal frequencies distributed among said servo sector signals in accordance with a predetermined pattern.

18. The record member set forth in claim 17 wherein said signal characteristics are distributed among groups of said servo signal bursts in accordance with a predetermined binary relationship wherein each group corresponds to a binary digit position representing said predetermined pattern.

19. The subject matter of claim 16 wherein servo signal bursts disposed along the length of the track location lines include two signal bursts of different durations such that for each track location line there are two signal bursts having a different geometric relationships thereto whereby amplitude integral relationships to a given track location line are unique within a band of said track location lines.

20. The record member set forth in claim 19 wherein servo signal bursts in each said sector consist of two groups of said signal bursts, with the signal bursts in one group associated with a given track location line being paired with a corresponding signal burst in a second one of said groups with the lengths being complementary within a given space along the length of said lines, respectively.

21. The record member set forth in claim 20 further including said signal bursts in each of said groups being disposed alternately intermediate said track location lines, respectively, and centered on said track location lines, respectively, whereby the area covered by said signal bursts adjacent a given track location line is unique to that line within said band.

22. The record member set forth in claim 20 wherein signal bursts in each of said groups alternately are centered on track location lines and disposed between adjacent track location lines whereby the spacing between adjacent ones of said signal bursts in each of said groups being less than the pitch between adjacent ones of said track location lines.

23. A track seek and follow circuit for use with a record member having a plurality of parallel tracks, each track identifiable by a unique sequence of predetermined signal bursts;

means for reading said signal bursts and supplying servo signals derived therefrom;

the improvement including in combination:

burst length comparator means for measuring and supplying an indication of the duration of said servo signals;

control means responsive to said indication to supply a set of control signals in accordance with said indications;

integrator means receiving said servo signals and responsive to said control signals to integrate said received servo signals at a rate in accordance with said control signals to thereby weight amplitudes of said servo signals; and first compare means for comparing said integrated servo signals from successive signal bursts in said sequence and supplying a position error signal in accordance with said comparison.

24. The track seek and follow circuit set forth in claim 23 wherein said integrator means includes up/down integrating means with storage means for accumulating the integration signals of said received servo signals;

said first compare means including means receiving said stored integrated servo signals for yielding a signal indicative thereof and further including means comparing said indicated integrated stored servo signals with a desired address for generating said position error signal.

25. The track seek and follow circuit set forth in claim 23 further including normalizing integration means receiving at least one of said servo signals and integrating same to generate a normalizing signal; and said first compare means including means responsive to said normalizing signal to adjust said position error signal in accordance therewith.

26. The track seek and follow circuit set forth in claim 25 wherein said means for reading supplies signal bursts having full amplitude and other signal bursts having less than full amplitude; and switching means in said normalizing integration means responsive to said control means indication to gate said received full amplitude servo signals to said normalizing integration means and blocking all other servo signals whereby normalization is achieved on a maximum signal amplitude.

27. The track seek and follow circuits set forth in claim 26 wherein said track means includes integration means for each said servo signal in said sequence for metering the length thereof and supplying signal indicia of said time duration;

read only memory means responsive to said time duration indicia to supply said control signals; and signal weighting means in said integrator means responsive to said control signals to adjust time constant of each said integrating means for normalizing amplitude with respect to measured time durations.

28. The track seek and follow circuit set forth in claim 26 further including PES generator means in said first compare means including:

means to receive indicia of a desired track to be accessed, a comparator circuit responsive to said received address indicia and to said control signals and to said position error signal to generate a pulse width modulated signal indicative of position error; and time measuring means actuating said comparator circuit for a duration indicative of the arithmetic difference between said desired track address, said control signals, and said position error signal.

29. The track seek and follow circuit set forth in claim 23 further including servo circuits for actuating relative movement between a transducer support and a record member;

a linear tachometer cooperating with said servo circuits for indicating position of said transducer with respect to a band of said tracks;

second compare means responsive to receive track indicia and said linear tachometer to indicate a coarse error position and supplying same to said servo circuits; and and servo circuits further receiving said position error signal from said first compare means.

30. The track seek and follow circuit set forth in claim 23 further including full-wave rectifier means receiving said supplied servo signals and supplying positive and negative rectified output signals indicative of the amplitude of said received servo signals;

first and second gating means respectively receiving said positive and negative rectified signals and responsive to said control signals to supply said positive and negative rectified signals at predetermined times; and summing means responsive to said first and second gating means to supply said signals to said integrator means.

31. The track seek and follow circuit set forth in claim 30 further including a normalizing integrator means;

gating means receiving one of said rectified signals from said rectifier and responsive to said control signals to gate said rectified signals to said normalizing integrator means;

second gating means responsive to other of said control signals to gate a reference potential to said normalizing integrator means; and said first compare means being responsive to said normalizing integrator means to adjust said position error signal in accordance therewith for normalizing same to instantaneous full amplitude readback servo signals.

32. The track seek and follow circuit set forth in claim 31 further including read only memory means responsive to said control signals for generating signals indicative of time amplitude characteristics of said received servo signals; and signal weighting means including transistorized current switching means in each said integration means responsive to said read only memory output signals to adjust the integration time constant of said integration means, respectively.

33. A servo signal processing circuit including in combination:

a first controllable integrator means for integrating a sequence of servo signals;

a second controllable integrator means for integrating only a given one servo signal of said sequence of servo signals;

a PES generator responsive to said first integrator means to generate a PES signal in accordance with said second integrator means integration; and means for controlling both said integrator means in accordance with predetermined servo characteristics.

34. The servo signal processing circuit set forth in claim 33 further including an analog-to-digital converter responsive to said first and second controllable integrator means to generate a digital indication of the integrated signal of said first integration means as adjusted by the integrated signal of said second integration means;

said PES generator including said analog-to-ditital converter further including time metering means;

means for receiving digital control indicia;

compare means determining the arithmetic difference between said received control indicia and the output of said analog-to-digital converter; and said time metering means being responsive to said difference for generating a signal for the duration representative of said arithmetic difference as said PES signal.

35. The servo signal processing circuit set forth in claim 33 wherein each said controllable integrator means includes a plurality of current switches connected to an integration summing node by weighted resistors for controlling the integration time of said controllable integrator means, respectively; and servo area energy determining means supplying signals indicative of the relative energy of the received servo signals and said controlling means actuating said transistor elements in each said controllable integrator means in accordance with said energy indications.

36. The servo signal processing circuit set forth in claim 35 further including full-wave rectifying means receiving said servo signals and supplying rectified positive and negative output signals indicative of the amplitude of the received servo signals;

first gating means responsive to said controlling means to gate either said positive or negative rectified signals to said first controllable integrator means in accordance with said predetermined signal characteristics;

second gating means responsive to said control means to gate one of said rectified signals to said second controllable integrator means and gating a reference potential to said second integrator means alternatively with said one rectified signal; and means in said controlling means indicating that a given servo signal has a maximum amplitude and said controlling means operating said second gating means to supply said one rectified signal to said second controllable integrator means whenever maximum amplitude is indicated.

37. Magnetic storage apparatus having a circular-like record member with a plurality of record tracks having locations defined by a plurality of parallel track location lines spaced apart a given distance, a transducer, means supporting said record medium and transducer for relative movement along and transverse to said track location lines for scanning said record medium to sense servo signals recorded in said servo sectors, the improvement including in combination:

said member having circumferentially interleaved and radially extending data and servo sectors;

each said one servo sector including a plurality of groups of circumferentially displaced servo positioning signals, each said servo sector exhibiting a repetitive pattern of said servo signals along radii of said record member, respectively, servo signals in one of said groups having circumferential lengths complementary to lengths of servo signals in another of said groups;

servo signal processing means responsive to said servo signals sensed by said transducer to simultaneously identify a desired track and supply a position error signal indicative of positioning errors and in accordance with said identified track; and a servomechanism responsive to said position error signal to actuate said supporting means to relatively move said transducer and record member toward said desired track.

38. Magnetic storage apparatus set forth in claim 37 wherein said record member servo sectors exhibit a repetitive positioning pattern, each said repetition encompassing a plurality of record track location lines greater than two; and positioning control means operatively connected to said servomechanism and having radial position indicating means independent of said servo sectors to position transducer in coaction with said servo signal processing means.

39. The method of indicating positioning relatively movable record and transducer members, said record member having servo signals for each desired position exhibiting a given servo energy to sequence positional relationship, the steps of:
positioning said members to approximately said desired position;
indicating said given energy sequency relationship;
measuring a calibrating energy from one of said servo signals;
measuring servo energy sensed by said transducer;
calibrating said servo energy measurement in accordance with measured calibrating energy of one of said servo signals in said sector; and
comparing said indication with said mesurement to generate a position error signal.

40. The method set forth in claim 39 further including:
selecting a maximum amplitude one of said servo signals in each sector as said one servo signal.

41. The method set forth in claim 40 further including:
combining a reference energy indication with said measured energy of said one servo signal for calibrating said servo energy measurement.

42. The method set forth in claim 39 further including:
measuring said servo signals for a signal characteristic other than energy; and
combining said other characteristic measurement with said calibrated servo energy measurement to indicate track position error.

43. The method set forth in claim 42 further including after measuring said servo signals for said other characteristics comparing same with expected other characteristics for a plurality of positions adjacent said desired position.

44. The method of claim 43 wherein said other characteristic includes different frequencies of servo signals.

45. The method of claim 43 wherein said other characteristic includes spacing and servo signal duration along said desired position.

46. The method of recovery from an off-track positioning error in a track following servo operating with a record member having sequential laterally offset track position indicia, said indicia having plural unique sensible signal characteristics, the steps of:
sensing for and measuring a first of said unique sensible signal characteristics associated with a track position to be followed;
sensing for and measuring a second of said unique sensible signal characteristics associated with a track position immediately adjacent to said track position to be followed;
sensing for and measuring other signal characteristics indicative of track following off-centered position; and
combining said measurements to generate an error signal in a given proportionate relationship to positioning error indicated thereby.

47. The method set forth in claim 46 wherein said unique characteristics include measuring a first frequency servo signal for a first track position indicia, measuring a second frequency servo signal for a second track position;
measuring servo energy content of sequential servo signals; and
combining all of said measurments to generate said error signal.

48. The method set forth in claim 47 further including:
measuring amplitudes of said sequential servo signals; and
combining said measured amplitude sequence with said other measurements to indicate track center position error.

49. The method of detecting track position error of a transducer relatively positionable with respect to a desired track position of a record member having a plurality of record tracks, each track position indicatable by a combination of laterally offset successively received servo signals each having one of a plurality of predetermined signal characteristics distributed among said servo signals in a predetermined pattern, the steps of:
sensing and memorizing said signal characteristics of successively received servo signals;
sensing and memorizing amplitudes of said successively received signals;
combining said memorized characteristics and amplitudes to indicate track position error.

50. The method set forth in claim 49 further including indicating track position in a digital sense by defining a first subset of track positions in accordance with said memorized amplitudes and defining a larger set of track positions including said defined subset by said signal characteristics.

51. The method set forth in claim 50 further including frequency detecting said signal characteristics.

52. A record member having a plurality of parallel track location lines, the improvement being a repetitive set of track location line identifying indicia, each set identifying a predetermined number of said track location lines, the improved article, including in combination:

a plurality of laterally offset recorded servo signals arranged in a plurality of groups transversely aligned with respect to said track location lines, each said recorded servo signals in each said group being separated along a direction transverse to the length of said track location lines by at least one-half a nominal spacing between adjacent lines;

transverse extents of servo signals in one group ending in a given alignment with one servo signal in an adjacent group, each said servo signal in each group exhibiting one of a plurality combined of frequency and signal amplitude characteristics in accordance with a predetermined pattern such that for a given number of said track location lines said successive servo signals along a given track location line exhibit a unique sequence of said frequency and amplitude signal characteristics.

53. The article set forth in claim 52 wherein said spacing between said servo signals in each said group is substantially the spacing between adjacent ones of said track location lines.

54. The article set forth in claim 53 wherein all of said servo signals extend between a given two of said track location lines and wherein at least one track location line is disposed between said given two track location lines.

55. The improved article set forth in claim 52 wherein spacing between servo signals in each group is one-half spacing between said track location lines.

56. The improved article set forth in claim 52 wherein predetermined ones of said track location lines alternately abut and disect servo signals in adjacent ones of said groups.

* * * * *

UNITED STATES PATENT AND TRADEMARK OFFICE
CERTIFICATE OF CORRECTION

PATENT NO. : 4,048,660
DATED : September 13, 1977
INVENTOR(S) : James Clifford Dennison; Hjalmar Holmboe Ottesen It is certified that error appears in the above-identified patent and that said Letters Patent are hereby corrected as shown below:

Column 19, line 20, after "bursts", insert --spaced--.

Column 19, line 26, after "servo", insert --sector--.

Column 21, line 22, delete "and", insert --said--.

Column 23, line 37, change "sequency" to --sequence--.

Signed and Sealed this

Eleventh Day of April 1978

[SEAL]

Attest:

RUTH C. MASON
Attesting Officer

LUTRELLE F. PARKER
Acting Commissioner of Patents and Trademarks